Patented July 24, 1923.

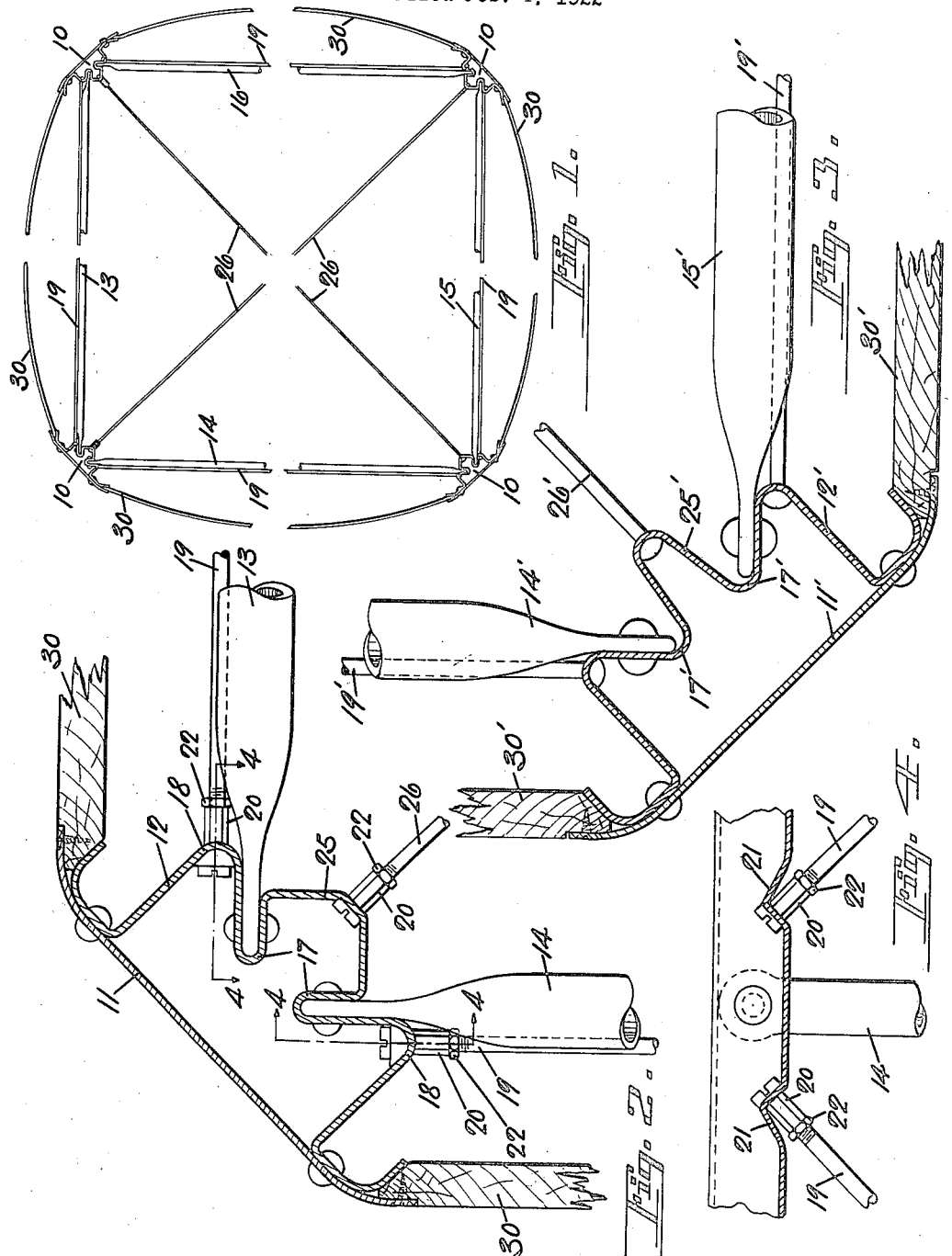

1,462,533

UNITED STATES PATENT OFFICE.

VIRGINIUS E. CLARK, OF DAYTON, OHIO, ASSIGNOR TO DAYTON-WRIGHT COMPANY, OF DAYTON, OHIO, A CORPORATION OF DELAWARE.

FUSELAGE CONSTRUCTION FOR AIRCRAFT.

Application filed February 4, 1922. Serial No. 534,228.

*To all whom it may concern:*

Be it known that I, VIRGINIUS E. CLARK, a citizen of the United States of America, residing at Dayton, county of Montgomery, and State of Ohio, have invented certain new and useful Improvements in Fuselage Constructions for Aircraft, of which the following is a full, clear, and exact description.

This invention relates to a frame construction which is especially adapted for use in the fuselage of an airplane.

An object of this invention is to provide a frame economical to manufacture and which has high strength relative to its weight.

Another object is to provide sheet metal longerons which have the connecting stress members, such as struts and diagonal wires, attached directly thereto without any intermediate fittings.

Another object is to provide the sheet metal longerons with convenient means for attaching thereto the forming members which envelop the stress members.

Further objects and advantages of the present invention will be apparent from the following description, reference being had to the accompanying drawing, wherein preferred forms of embodiments of the present invention are clearly shown.

In the drawing:

Fig. 1 is a transverse section through a fuselage constructed according to my invention and showing the forming stringers giving the fuselage a rounded outer form.

Fig. 2 is an enlarged detail of the longeron and connecting members shown in Fig. 1, but showing the forming stringers straight instead of curved.

Fig. 3 is a view similar to Fig. 2, but showing a modified form of longeron.

Fig. 4 is a view on lines 4—4 of Fig. 2 showing a method of attaching and adjusting the tension of the diagonal tension members.

Similar reference characters refer to similar parts throughout the several views.

In Fig. 1, the sheet metal longerons 10 are built up from an outer plate 11 and an inner plate 12 which are riveted together as clearly illustrated in Fig. 2. The struts 13, 14, 15 and 16 are preferably metal tubes with flattened extremities which fit into the reentrant folds 17 in the plate 12 and are riveted thereto as shown in Fig. 2. These folds or grooves 17 are preferably so located that the center lines of the struts when produced will pass approximately through the center of the longeron section. Closely adjacent the folds 17 are the salient folds 18 to which are attached the diagonal tension members 19. These wires 19 are preferably attached to the longeron by means of the headed screw threaded nuts 20 (see Fig. 4). The sheet metal is "bumped-up" as shown at 21 to provide a flat bearing surface for the heads of nuts 20. Lock nuts 22 are provided to retain the tension adjustment. Only one end of wires 19 is provided with the nuts 20, the opposite ends having a head set at an angle to obviate the necessity of "bumping up" the sheet metal at that end (see Fig. 3).

The plate 12 is also provided with a salient fold 25 to which is attached the cross brace wires 26 in a manner similar to the attachment of wires 19 as illustrated in Fig. 2.

The edges of plates 11 and 12 are spread apart beyond the rivets to provide a suitable recess for the ends of the forming stringers 30, which give a smooth outside shape to the fuselage as shown in Fig. 1. This outside shape may be round, only slightly rounding, or rectangular, as may be desired. The forming stringers 30 are of course very light since they take none of the fuselage stresses, and are preferably made of wood such as spruce or poplar. They may be held in place by small wood screws.

Fig. 3 shows a modified form of built up sheet metal longeron, similar in all respects to the longeron shown in Fig. 2, with the exception that the reentrant folds 17' have a different shape.

With this form the plate 12' may be rolled to shape more easily. Fig. 3 also shows the head ends of the tension wires instead of the ends having the threaded nuts 20.

While the forms of mechanisms herein shown and described constitute preferred forms of embodiments of the present invention, it is to be understood that other forms might be adopted, all coming within the scope of the claims which follow.

What I claim is as follows:

1. A fuselage frame for airplanes comprising: longerons built up from sheet metal; a plurality of struts connecting said longerons; and diagonal brace members between said struts attached to said longerons substantially at the point of attachment of said struts; said built-up longerons having a box section with reentrant bends for attaching the struts thereto.

2. A fuselage frame for airplanes comprising: longerons built up from sheet metal; a plurality of struts connecting said longerons; and diagonal brace members between said struts; said built-up longerons having a box section with reentrant bends for attaching the struts thereto in such a way that the center lines of the struts pass approximately through the center of the box section.

3. A fuselage frame for airplanes comprising: longerons built up from sheet metal; a plurality of struts connecting said longerons; and diagonal brace wires between said struts; said built-up longerons having a box section with reentrant bends for attaching the struts thereto and salient bends for attaching the diagonal brace wires.

4. A fuselage frame for airplanes comprising: longerons built up from sheet metal; a plurality of struts connecting said longerons; and diagonal brace wires between said struts; said built-up longerons having a box section with salient bends for attaching the diagonal brace wires thereto.

5. A fuselage frame for airplanes comprising: longerons built up from sheet metal; a plurality of struts connecting said longerons; and diagonal brace wires between said struts; said built-up longerons having a box section with salient bends for attaching the diagonal brace wires thereto in such a way that the center lines of the brace wires pass approximately through the center of the box section.

6. A fuselage frame comprising: longerons built up from sheet metal; stress members connecting said longerons; and forming members enveloping said stress members; the sheet metal of said built-up longerons being bent to form recesses for the attachment of the stress members and forming members.

7. A fuselage frame for aircraft comprising: longerons built up from sheet metal; a plurality of struts and diagonal tie members connecting said longerons in such a manner as to form trusses, said diagonal tie members being attached to said longerons at the tips of salient bends in said longerons.

8. A fuselage frame for aircraft comprising: longerons built up from sheet metal; a plurality of struts and diagonal tie members connecting said longerons in such a manner as to form trusses, said diagonal tie members being attached to said longerons, by extending through an aperture in said longeron and having an enlarged head on the opposite side of said aperture.

In testimony whereof I hereto affix my signature.

VIRGINIUS E. CLARK.

Witnesses:
 Geo. E. Pasco,
 Wm. P. Pasco.